US012584633B2

(12) United States Patent
Ar

(10) Patent No.: US 12,584,633 B2
(45) Date of Patent: Mar. 24, 2026

(54) ROTARY PUSH BUTTON SWITCH SYSTEM FOR GAS-BURNING STOVES

(71) Applicants: TERMAL ELEKTRONIK VE DEVRE ELEMANLARI SANAYI TICARET ANONIM SIRKETI, Bilecik (TR); Baris Ar, Bilecik (TR)

(72) Inventor: Baris Ar, Bilecik (TR)

(73) Assignee: TERMAL ELEKTRONİK VE DEVRE ELEMANLARI SANAYİ TİCARET ANONİM ŞİRKETI., AND Bariş AR, Bilecik (TR)

( * ) Notice: Subject to any disclaimer, the term of this patent is extended or adjusted under 35 U.S.C. 154(b) by 349 days.

(21) Appl. No.: 18/039,254

(22) PCT Filed: Sep. 20, 2021

(86) PCT No.: PCT/TR2021/000003
§ 371 (c)(1),
(2) Date: May 29, 2023

(87) PCT Pub. No.: WO2022/132069
PCT Pub. Date: Jun. 23, 2022

(65) Prior Publication Data

US 2024/0003547 A1 Jan. 4, 2024

(30) Foreign Application Priority Data

Dec. 16, 2020 (TR) ................................ 2020/20699

(51) Int. Cl.

| | |
|---|---|
| *F24C 3/12* | (2006.01) |
| *F24C 3/10* | (2006.01) |
| *G05G 5/05* | (2006.01) |
| *G05G 9/04* | (2006.01) |
| *H01H 13/14* | (2006.01) |
| *H01H 19/14* | (2006.01) |

(52) U.S. Cl.
CPC ................ *F24C 3/12* (2013.01); *F24C 3/103* (2013.01); *G05G 5/05* (2013.01); *G05G 9/04* (2013.01); *H01H 13/14* (2013.01); *H01H 19/14* (2013.01)

(58) Field of Classification Search
CPC ...... H01H 13/14; H01H 19/14; H01H 25/008; H01H 25/06; F24C 3/12; F24C 3/103; F24C 3/126; F24C 3/122
See application file for complete search history.

(56) References Cited

U.S. PATENT DOCUMENTS

| | | | | |
|---|---|---|---|---|
| 2009/0321231 | A1 | 12/2009 | Tegel et al. | |
| 2012/0247452 | A1 | 10/2012 | Pianezze | |
| 2015/0107462 | A1 | 4/2015 | Moro et al. | |
| 2016/0111235 | A1 | 4/2016 | Cartapatti | |
| 2019/0094901 | A1 | 3/2019 | Wait et al. | |
| 2020/0176202 | A1 * | 6/2020 | Yoshihara .............. | H01H 25/06 |

* cited by examiner

*Primary Examiner* — Ko-Wei Lin
(74) *Attorney, Agent, or Firm* — Jose Cherson Weissbrot

(57) ABSTRACT

The present invention concerns rotary push button switch system for all types of gas-burning stoves, including ovens and cookers, which is used on gas-cocks to create arc-form sparks with up-and-down linear movement to ignite the gas, which activates lighting, fan, or another ignition element within the stove-oven by rotational movement, and which enables on-off operation with two separate energy systems.

7 Claims, 8 Drawing Sheets

ROTARY PUSH BUTTON SWITCH SYSTEM FOR GAS-BURNING STOVES

TECHNICAL FIELD

The present invention concerns the rotary push button switch system for all types of gas-burning stoves and heaters, including ovens and cookers, which is used in accompany with gas-cocks and applies electricity energy to ignition system.

In particular way, the invention refers to a rotary push button switch system, which is used on gas-cocks to create arc-form sparks with up-and-down linear movement to ignite the gas, which activates lighting, fan, or another ignition element within the stove-oven by rotational movement, and which enables on-off operation with two separate energy systems.

CURRENT STATE OF ART

All types of gas-burning stoves, cookers, and similar products need a heat-arc energy to ignite the gas and create flame when gas-flow to system is initiated by moving gas-cock shaft. There are ignition transformers used to obtain this energy. Contacts, which come into active-contact with the effect of rotation or linear movement of gas-cock shaft and provide supply voltage for the said ignition transformers, and push or rotary switch systems, which provide electric current to create an arc-shaped spark, are used.

In the current state of art, the push or rotary switch systems are activated by downward or rotational movement of gas-cock shaft to allow electric current to the ignition transformer when gas flow to the system starts, which use the spark generated by transformer only for the purpose of igniting the supplied gas. In order to activate other electronic or mechanical applications such as lighting, fans, etc in the rotary or push type switch systems connected to the gas-cock shaft to ignite the gas in gas-burning cookers and heaters, various sensors such as thermocouple, buzzer, and complicated circuit boards for such sensors should be used, which will increase the cost. For this reason, in addition to the increase in part costs during the manufacturing phase, additional control and production processes are also needed, which implies huge production costs. In the current state of art, much felt the need for a rotary push button switch system that enables to eliminate this situation.

As a result, existence of above-mentioned problems and inadequacy of existing solutions made it necessary to make an improvement in the relevant technical field.

DISCLOSURE OF INVENTION

The invention concerns a rotary push button switch system for gas cookers, which eliminates above-mentioned disadvantages and introduces new advantages to relevant technical field.

The aim of invention is mainly to construct a rotary push button switch system, which is used on gas-cocks to create arc-form sparks with up-and-down linear movement to ignite the gas, which activates lightning, fan, or other ignition elements within the stove-oven by rotational movement, and which enables on-off operation with two separate energy systems.

Aim of invention is to construct a rotary push button switch system, which increases application variety in all gas cookers and heaters, including ovens and stoves.

Another aim of invention is to obsolete various sensors such as thermocouples, buzzers and complicated circuit boards for these sensors to activate electronic or mechanical applications in switching systems, which pose additional costs, and to reduce production costs in this way.

Another aim of invention is to prevent entry of dust and water into switching system thanks to compatible structure of the body and cover.

Moreover, it is also the aim of present invention to eliminate partial loose contacts by ensuring that the contacts press in a balanced manner during up-and-down movement of switching system in the gas ignition process.

In order to meet all above mentioned aims, which may also be understood from detailed description, the present invention concerns rotary push button switch system for all types of gas-burning stoves, including ovens and cookers, which is used on gas-cocks to create arc-form sparks with up-and-down linear movement to ignite the gas, which activates lightning, fan, or another ignition elements within the stove-oven by rotational movement, and which enables on-off operation with two separate energy systems.

To that aim, the present invention foresees:

a body connected to the gas-cock shaft, a hub, which moves up-and-down linearly in the body center in conjunction with linear movement of and makes rotational movement in conjunction with rotational movement of gas-cock shaft, a washer contact terminal positioned on the lug extending downwards from the bottom of the hub, a spring that ensures the washer contact terminal to rest on the lug by applying a thrust to the washer contact terminal, first push contact terminal and second push contact terminal, which are positioned reciprocally in the slots formed in the body and start electricity flow for ignition of gas upon contact of washer contact terminal when the gas flow to the system starts with linear movement of the hub, rotary contact terminal located in the slot formed in the body and connected to the lighting, fan or other ignition element in the furnace-stove, flexible rotary contact terminal positioned across the rotary contact terminal in the slot formed in the body, which contacts rotary contact terminal with the rotational movement of the hub and transmits electric current to the rotary contact terminal for the operation of lighting, fan or other ignition element inside the furnace-cooker, a cover that is closed on the body.

Structural and characteristic features of the invention and all its advantages will be understood more clearly thanks to the drawings given below and the detailed description written with reference to these figures. The evaluation should therefore be made by taking these figures and detailed descriptions into consideration.

DESCRIPTION OF EMBODIMENTS

Figure 1:
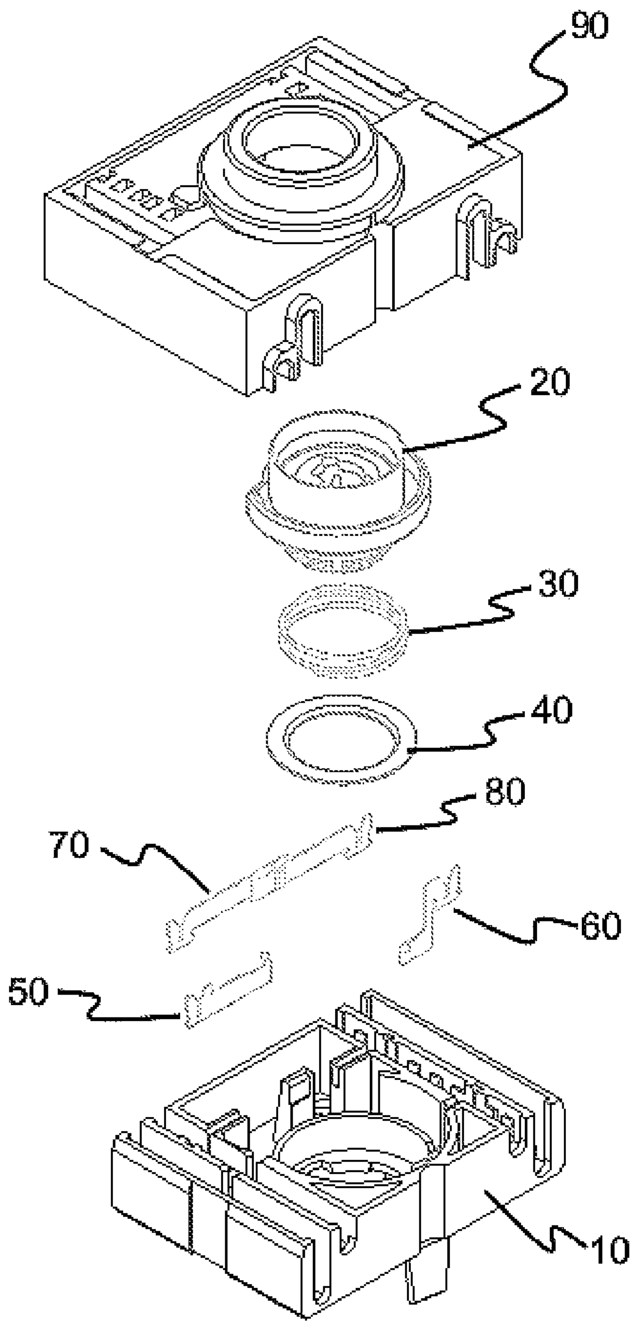
FIG. 1: It represents various separate components that, when assembled, constitute rotary push button switch system in accordance with the invention.

10. Body
11. Slot
12. Cable conduit
13. Locating lug
20. Hub
21. Cam
22. Lug
23. Protrusion
30. Spring
40. Washer contact terminal
50. First push-type contact terminal
60. Second push-type contact terminal
70. Rotary contact terminal
80. Rotary flexible contact terminal
90. Cover
91. Intrusion

Detailed Description of Embodiments

Preferred alternatives of the rotary push button switch system are explained in this detailed description only for a better understanding of the subject and without posing any limiting effect.

FIG. 1*a* represents various separate components that, when assembled, constitute rotary push button switch system in accordance with the invention. With reference to FIG. 1*a*, rotary push button switch system, in its most basic form, comprises a body (10) connected to the gas cock shaft; a hub (20), which moves up-and-down in conjunction with linear movement of gas-cock shaft in the center of body (10) and by being positioned on the lugs (22) extending downwards from the bottom and ensures ignition of gas through contact of the washer contact terminal (40) onto first push contact terminal (50) and second push contact terminal (60) inside body (10) with the thrust applied onto washer contact terminal (40) by means of a spring (30) and which, at the same time, also ensures operation of lighting, fan or other ignition element inside the furnace-cooker through the contact of rotary flexible contact terminal (80) inside the body (10) to the rotary contact terminal (70) connected to the lighting, fan or other ignition element inside the oven-cooker by means of the cam (21) in the upper part of the gas-cock shaft.

The body (10) constitutes main structure of the rotary push button switch system, which is the subject matter of the invention. There are slots (11) formed on inner surface of the body (10), cable conduits (12) formed on it (10), and locating lugs (13) extending downwards on its lower surface.

The hub (20), which rotates or moves up-and-down linearly in order to control operating regime depending on the movement of the gas-cock shaft of the rotary push button switch system, is positioned in the center of the body (10).

Figure 2A:
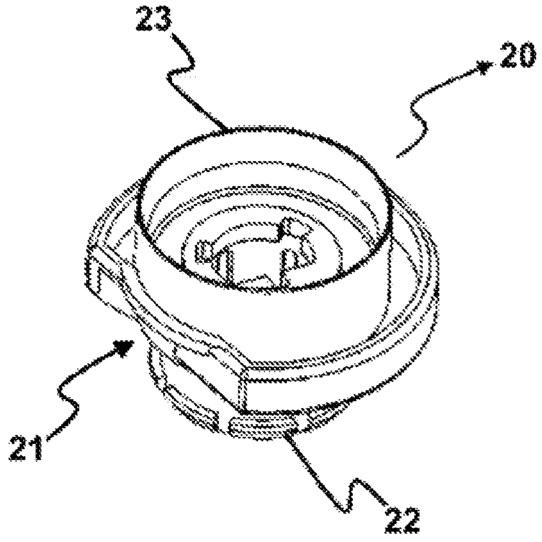
FIG. 2*a*: It represents top perspective view of the hub of rotary push button switch system in accordance with the invention.
Figure 2B:
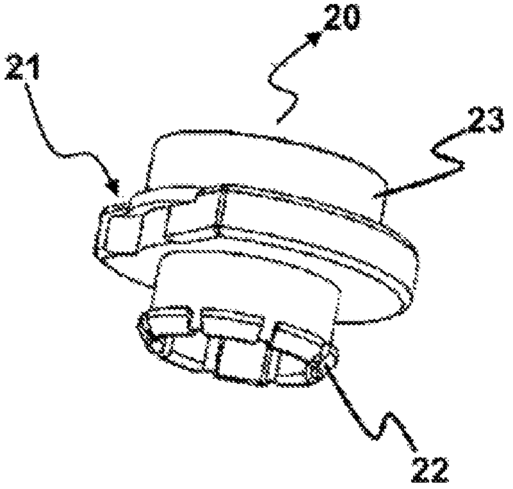
FIG. 2*b*: It represents base perspective view of the hub of rotary push button switch system in accordance with the invention.
Figure 3:
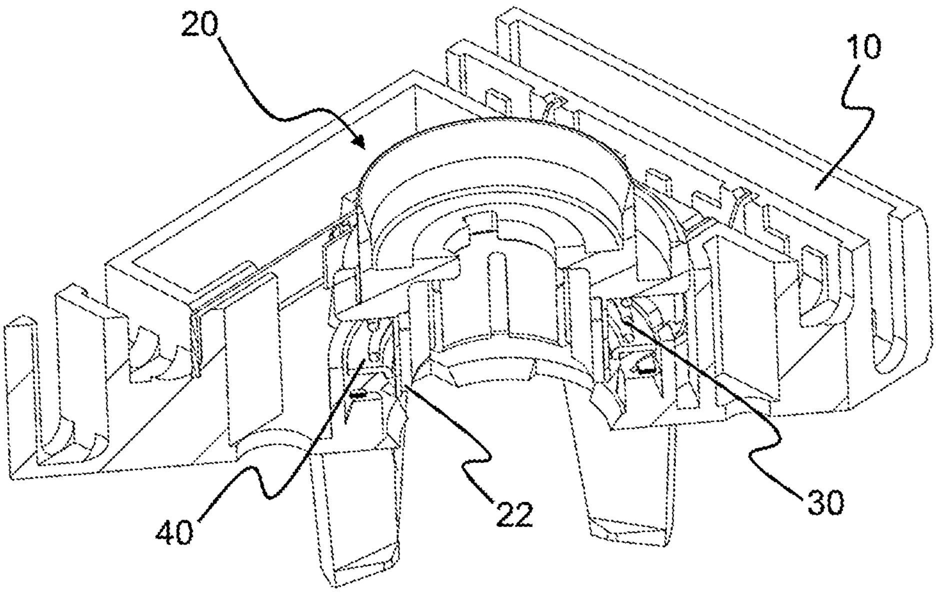
FIG. 3: It represents sectional view of the rotary push button switch system in accordance with the invention.

As seen in FIG. 2*a* and FIG. 2*b*, there is a semicircular intrusion-shaped cam (21) on the upper part of the hub (20), lugs (22) extending downwards from the lower part of the hub (20), and a protrusion (23) extending upwards on it (20). As seen in FIG. 3, a cylindrical spring (30) and a circular washer contact terminal (40) are positioned on these lugs (22). The spring (30) applies thrust onto washer contact terminal (40) and ensures the washer contact terminal (40) to rest on the lugs.

Figure 4:
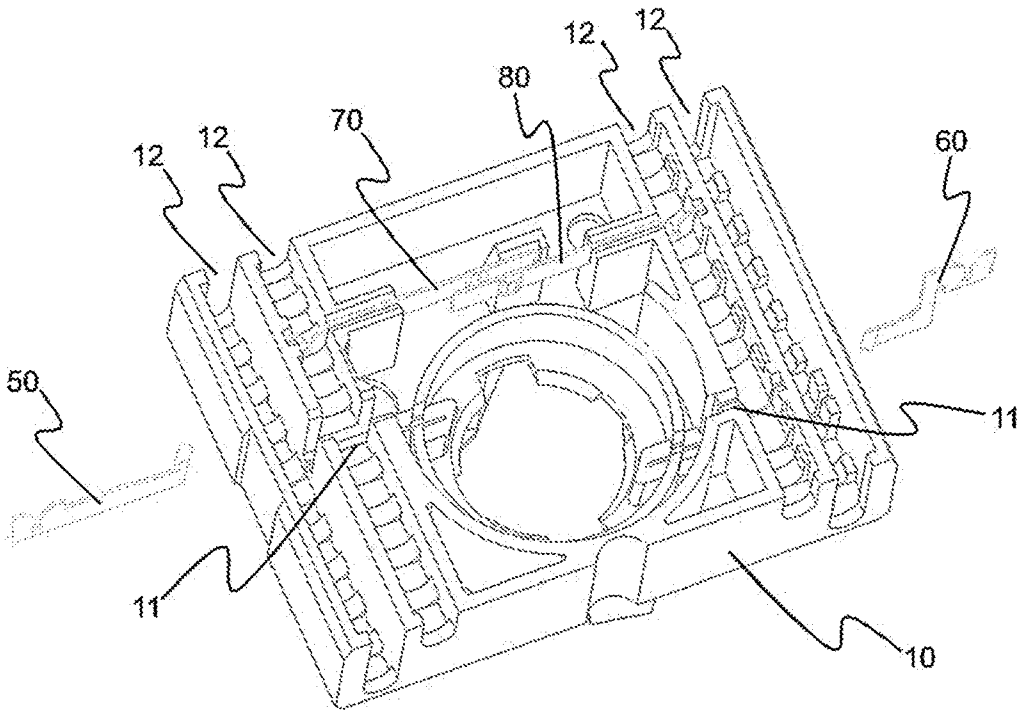
FIG. 4: It represents perspective view of the first push contact terminal, second push contact terminal, rotary contact terminal and flexible rotary contact terminal of the rotary push button switch system.
Figure 5:
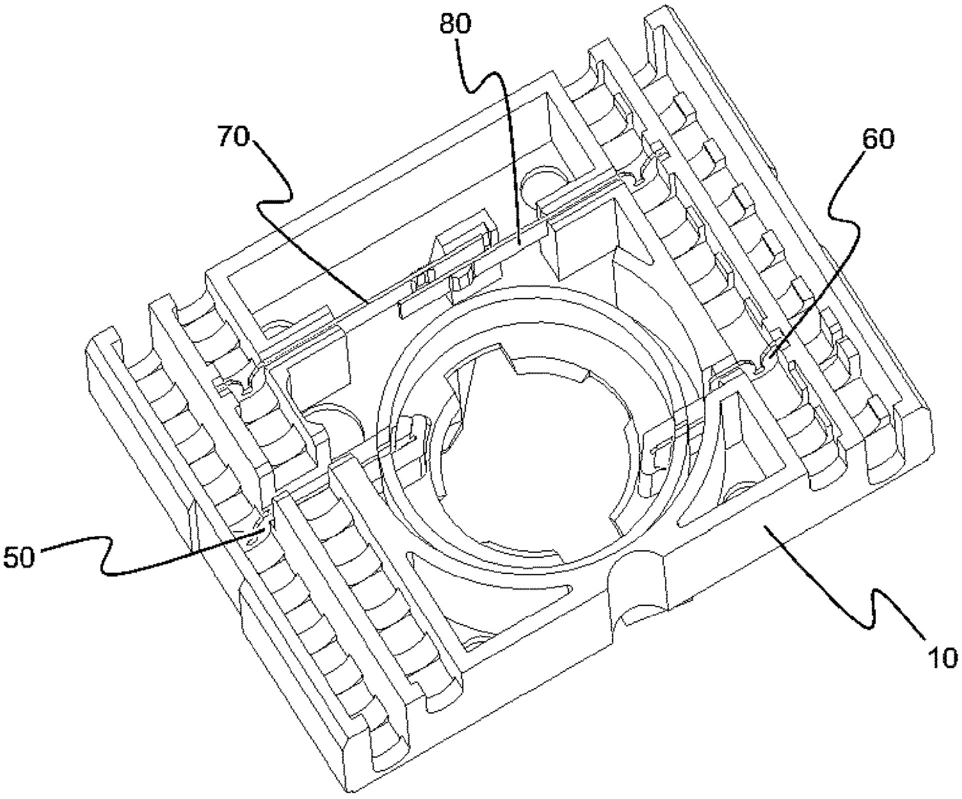
FIG. 5: It represents further perspective view of the first push contact terminal, second push contact terminal, rotary contact terminal and flexible rotary contact terminal of the rotary push button switch system.

As seen in FIG. 4 and FIG. 5, first push contact terminal (50) and second push contact terminal (60) are placed reciprocally in the slots (11) formed inside the body (10). Said first push contact terminal (50) and second push contact terminal (60) are interconnected via the cables placed in the cable conduits (12) formed on the body (10) and ensures initiation of electric current to ignite the gas via contact of washer contact terminal (40) driven by up-and-down linear movement of the hub (20). The washer contact terminal (40), which moves downwards by being driven by the linear movement of the hub (20) in conjunction with linear movement of the gas-cock shaft, presses evenly on the first push contact terminal (50) and the second push contact terminal (60) thanks to its circular form.

Figure 6:
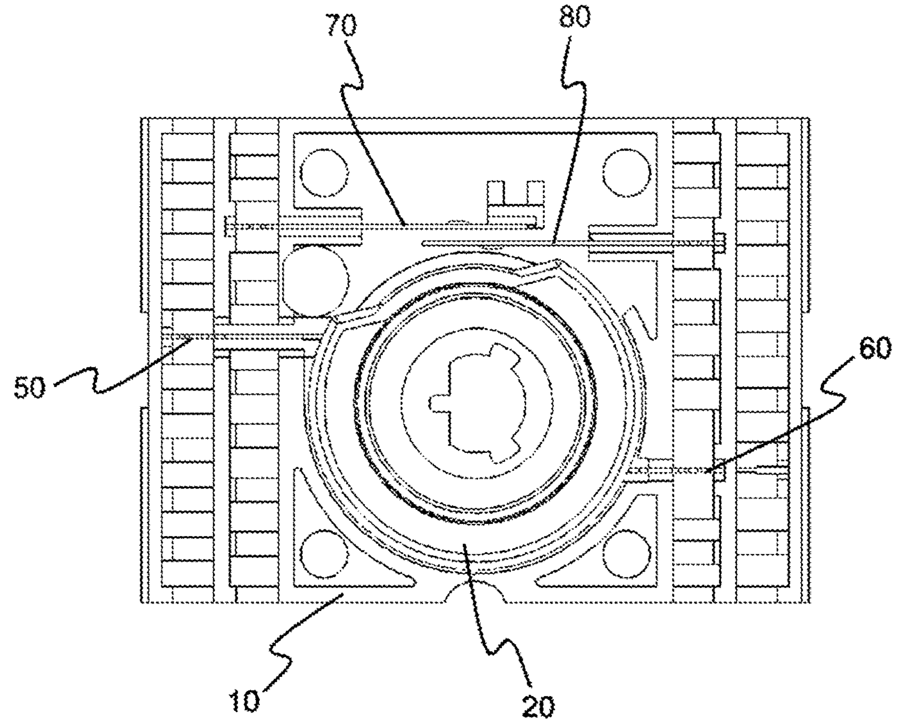
FIG. 6: It represents top view of the rotary contact terminal and flexible rotary contact terminal of the rotary push button switch system within the body.

As seen in FIG. 6, the rotary contact terminal (70) and rotary flexible contact terminal (80) which contacts rotary contact terminal (70) are located in the slots (11) formed reciprocally in the body (10) for the operation of lighting, fan or other ignition element inside the furnace-stove.

Figure 7:
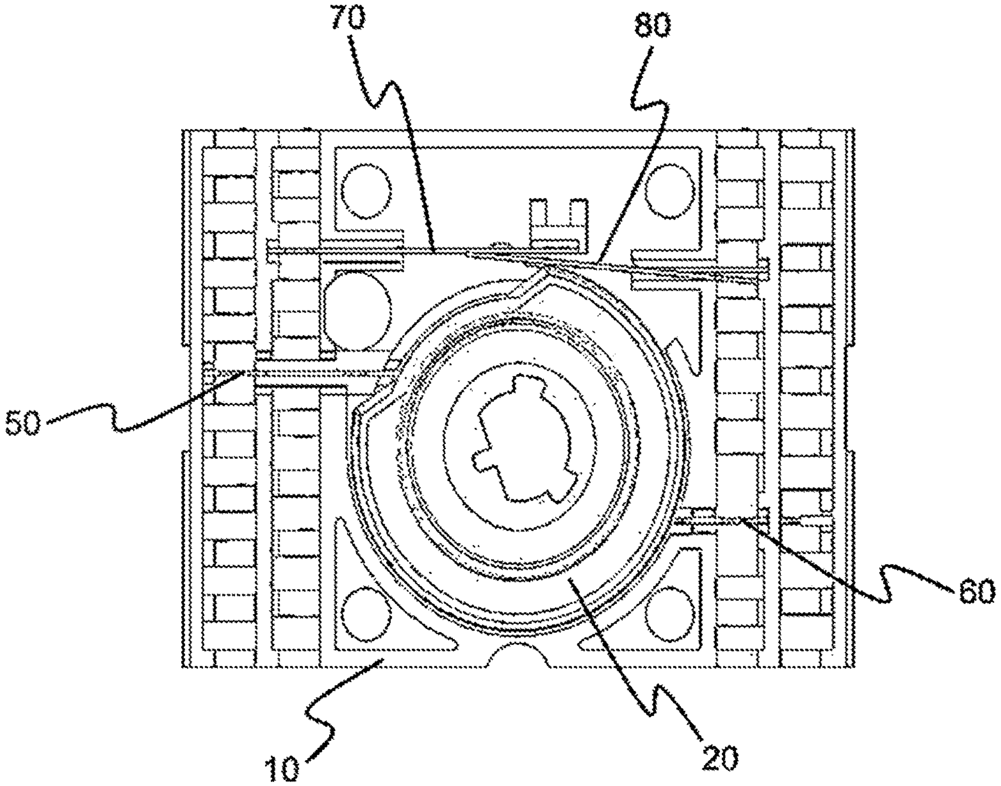
FIG. 7: It represents top view of the rotary contact terminal and flexible rotary contact terminal of the rotary push button switch system, in contact with each other as result of rotational movement of the hub.

The rotary contact terminal (70) is connected to the lighting, fan or other ignition element inside the furnace-oven via the cables placed in the cable conduits (12) formed on the body (10). The rotary flexible contact terminal (80), on the other hand, is connected with the cables placed in the cable conduits (12) formed on the body (10) in order to transmit electric current for the operation of the lighting, fan or other ignition element in the furnace-stove and it flexes by the thrust applied by the cam (21) on the hub (20) with rotational movement of the hub (20) and contacts rotary contact terminal (70) as seen in FIG. 7 and ensures transmission of electric current.

Figure 8:
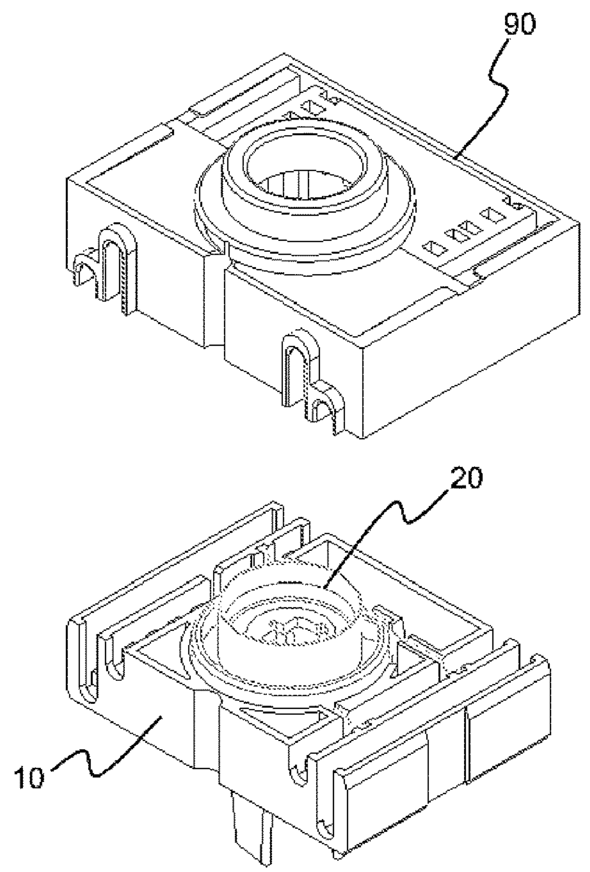
FIG. 8: It represents view of the body and cover of rotary push button switch system, as dismantled, in accordance with the invention.
Figure 9:
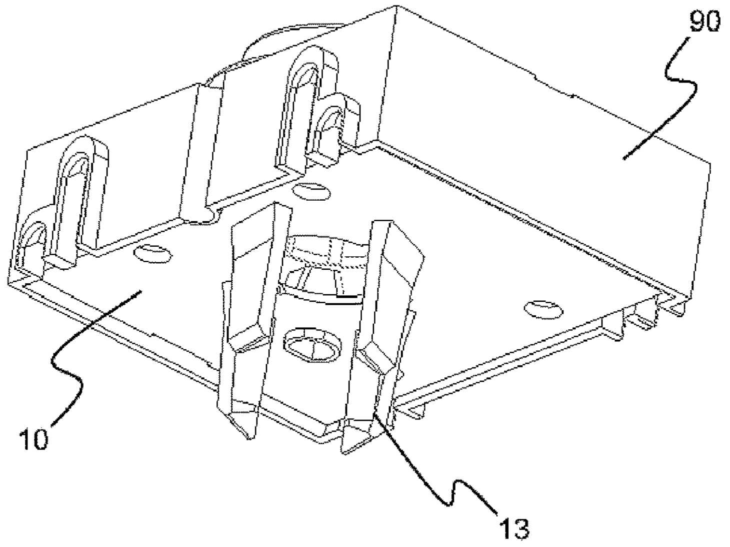
FIG. 9: It represents base perspective view of the rotary push button switch system in accordance with the invention.
Figure 10:
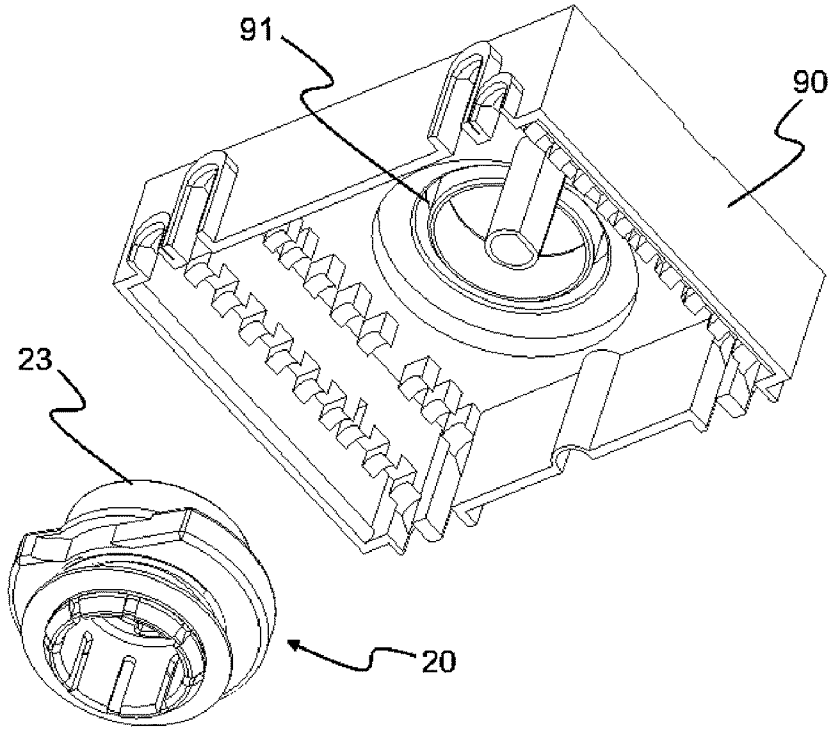
FIG. 10: It represents base perspective view of the cover and hub of rotary push button switch system in accordance with the invention.

As can be seen in FIG. 8 and FIG. 9, a cover (90) suitable to the outer form of the body (10) and which encloses its entire circumference is put on the body (10) in order to prevent entry of dust and water into the body (10). As seen in FIG. 10, an intrusion (91) is formed on the inner surface of the cover (90) in accordance with the form of protrusion (23) on the hub (20). Thus, when the cover (90) is closed on the body (10), the protrusion (23) on the hub (20) is positioned in the intrusion (91) on the inner surface of the cover (90) and entry of dust is prevented by providing a sealing between the hub (20) and the cover (90).

The body (10) is fixed to the gas-cock by locking it by means of locating lugs (13) extending downwards on its lower surface.

Figure 11:
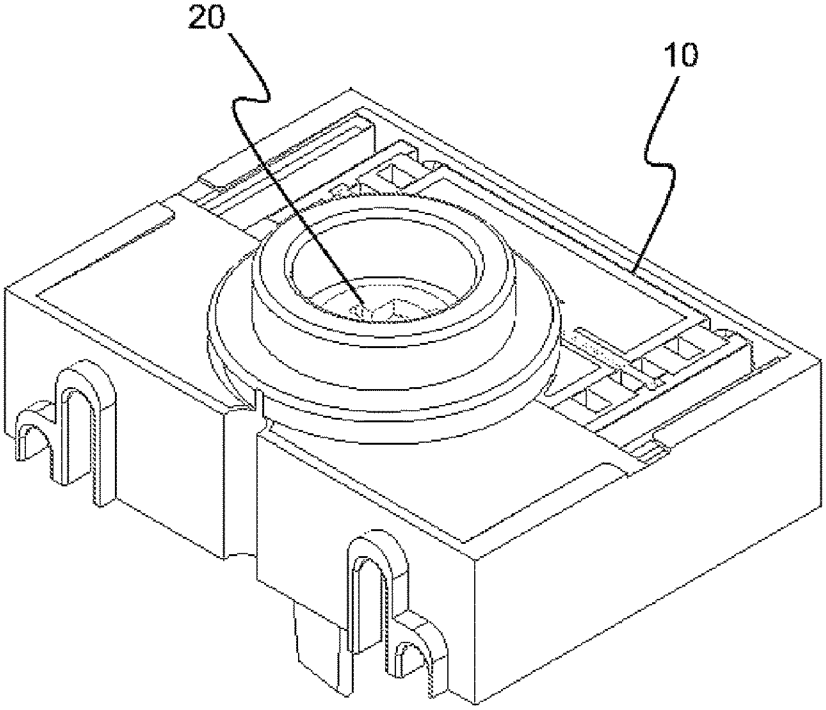
FIG. 11: It represents view of the rotary push button switch system in accordance with the invention.
Figure 12A:
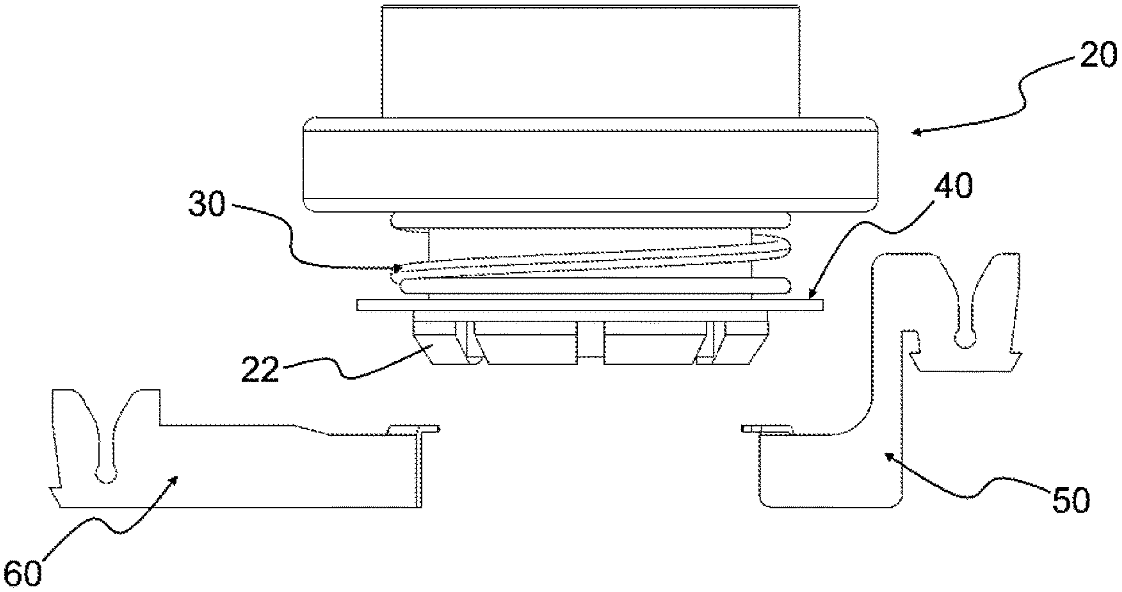
FIG. 12*a*: It represents representative view of linear movement of the hub of rotary push button switch system in accordance with the invention.
Figure 12B:
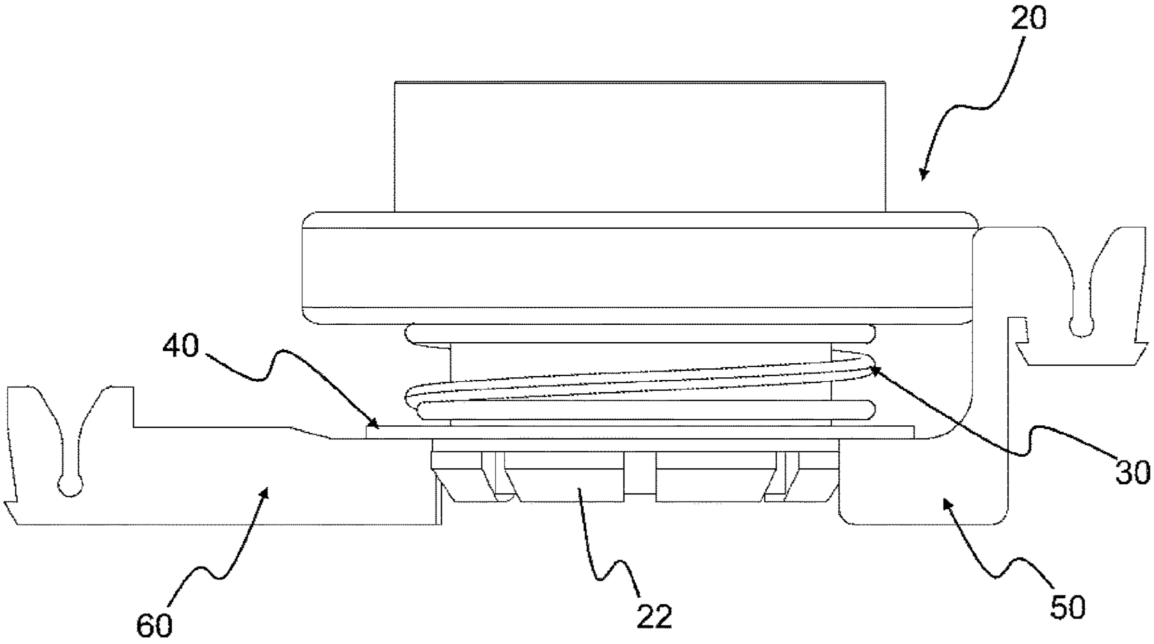
FIG. 12*b*: It represents representative view of the hub of rotary push button switch system, as positioned downwards with linear movement, in accordance with the invention.

The operating principle of rotary push button switch system seen in FIG. 11 is as follows:

When pressed on the gas-cock shaft the hub (20) seen in FIG. 12*a* moves linearly downwards inside the body (10). In the rotary push button switch system, the washer contact terminal (40) which rests on the lugs (22) underneath the hub (20) by means of a spring (30) contacts on the first push contact terminal (50) and second push contact terminal (60) as seen in FIG. 12*b* and ensures ignition of gas with the gas flow by starting arc formation process.

With the rotation of the gas-cock shaft, the cam (21) in the upper part of the hub (20) applies a thrust onto rotary flexible contact terminal (80), which, in turn, flexes and contacts with rotary contact terminal (70). When electric current is transmitted to rotary contact terminal (70), the lighting, fan or other ignition element in the furnace-cooker is ensured to operate.

What is claimed is:

1. A rotary push button switch system for all types of gas-burning stoves, including ovens and cookers, the switch system being used on a gas-cocks shaft to create arc-form sparks with up-and-down linear movement to ignite the gas, which activates lightning, fan, or other ignition elements within a stove-oven by rotational movement, and which enables on-off operation with two separate energy systems, and comprising:

a body (10) configured to be mounted on the gas-cock shaft, a hub (20), which moves up-and-down linearly in the center of the body (10) in conjunction with linear movement of and makes rotational movement in conjunction with rotational movement of the gas-cock shaft, a washer contact terminal (40) positioned on a plurality of lugs (22) extending downwards from a bottom portion of the hub (20), a spring (30) that forces the washer contact terminal (40) to rest on the plurality of lugs (22) by applying a thrust to the washer contact terminal (40), a first push contact terminal (50) and a second push contact terminal (60), which are positioned reciprocally in a plurality of slots (11) formed in the body (10) and start electricity flow for ignition of gas upon contact of the washer contact terminal (40) when the gas flow to the system starts with linear movement of the hub (20), rotary contact terminal (70) located in one of the plurality of slots (11) formed in the body (10) and connected to the lighting, fan, or other ignition elements in the stove-oven, a rotary flexible contact terminal (80) positioned across the rotary contact terminal (70), which contacts the rotary contact terminal (70) with the rotational movement of the hub (20) and transmits electric current to the rotary contact terminal (70) for the operation of lighting, fan or other ignition element inside the furnace-cooker, a cover (90) that is closed on the body (10).

2. A rotary push button switch system, as per claim 1, further comprising: the washer contact terminal (40) in circular form, which moves downwards with the linear movement of the said hub (20) and presses on the first push contact terminal (50) and the second push contact terminal (60) in order to ignite the gas when gas flow to the system starts.

3. A rotary push button switch system, as per claim 1, further comprising: a cam (21) in the form of semicircular intrusion located in the upper part of said hub (20) and which enables the rotary flexible contact terminal (80) to contact the rotary contact terminal (70) by applying a thrust to the rotary flexible contact terminal (80) with rotational movement of the hub (20).

4. A rotary push button switch system, as per claim 1, further comprising: a cable conduit (12) located on the said body (10) and accommodating cables connected to the first push contact terminal (50), the second push contact terminal (60), the rotary contact terminal (70) and the rotary flexible contact terminal (80).

5. A rotary push button switch system, as per claim 1, further comprising: the locking lug (13) which extends downwards from a lower surface of the said body (10) and ensures the body (10) is locked and fixed to gas-cock.

6. A rotary push button switch system, as per claim 1, further comprising: the cover (90) suitable to the outer form of the body (10) and which encloses its entire circumference is put on the body (10) in order to prevent entry of dust and water into the body (10).

7. A rotary push button switch system, as per claim 1, further comprising: a protrusion (23) extending upwards on the hub (20) and positioned in an intrusion (91) on an inner surface of the cover (90) to provide a seal between the hub (20) and the cover (90).

* * * * *